United States Patent [19]
Adahan

[11] 3,772,672
[45] Nov. 13, 1973

[54] DIFFERENTIAL PRESSURE WARNING DEVICE FOR DUAL BRAKE SYSTEM

[75] Inventor: Carmeli Adahan, Dearborn, Mich.

[73] Assignee: Ford Motor Company, Dearborn, Mich.

[22] Filed: June 28, 1971

[21] Appl. No.: 157,623

Related U.S. Application Data
[63] Continuation of Ser. No. 785,218, Dec. 19, 1968, abandoned.

[52] U.S. Cl............ 340/242, 340/52 C, 188/151 A
[51] Int. Cl........................ G08b 21/00, B60t 11/10
[58] Field of Search.................... 340/52 C, 242; 188/151 A; 303/6 C

[56] References Cited
UNITED STATES PATENTS

| | | |
|---|---|---|
| 3,427,582 | 2/1969 | Brandon, Jr. ............ 340/242 X |
| 3,448,230 | 6/1969 | Bueler............... 188/151 A |
| 3,480,333 | 11/1969 | Stelzer......... 188/151 A X |

Primary Examiner—John W. Caldwell
Assistant Examiner—Daniel Myer
Attorney—John R. Faulkner and Clifford L. Sadler

[57] ABSTRACT

A differential pressure warning device for a split or dual brake system having a shuttle piston constructed to move to either of two extreme positions in response to a pressure failure in a portion of the brake system and to thereby actuate a warning buzzer or light. The piston is constructed to automatically center itself in a neutral position when equal pressures are restored in the system.

12 Claims, 4 Drawing Figures

PATENTED NOV 13 1973 3,772,672
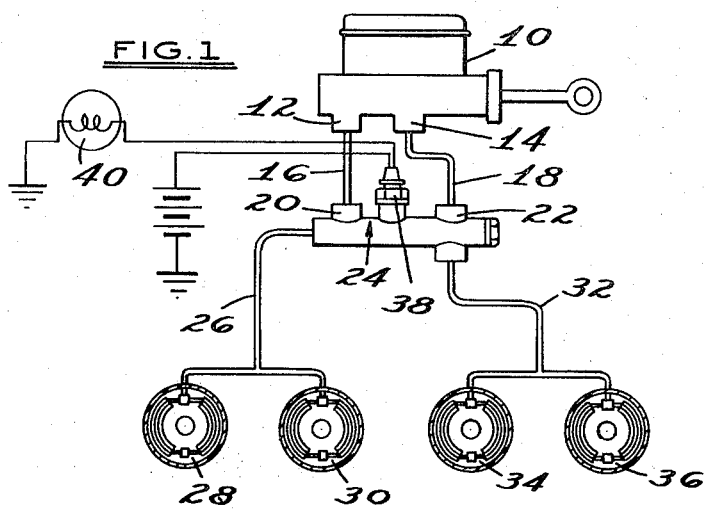
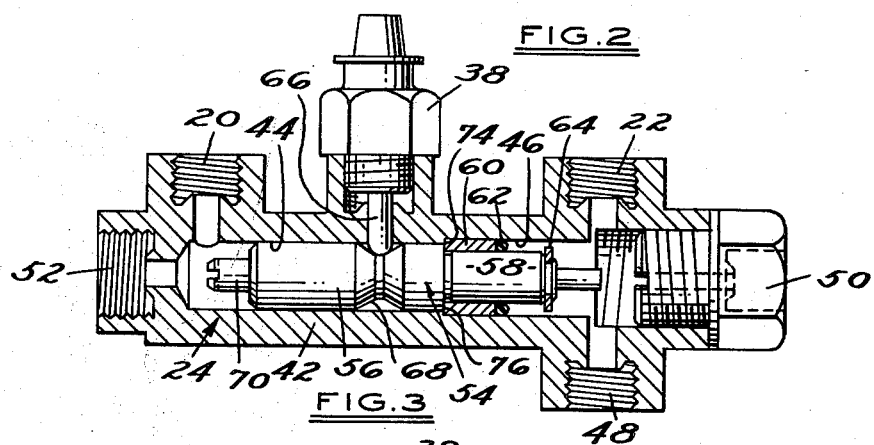
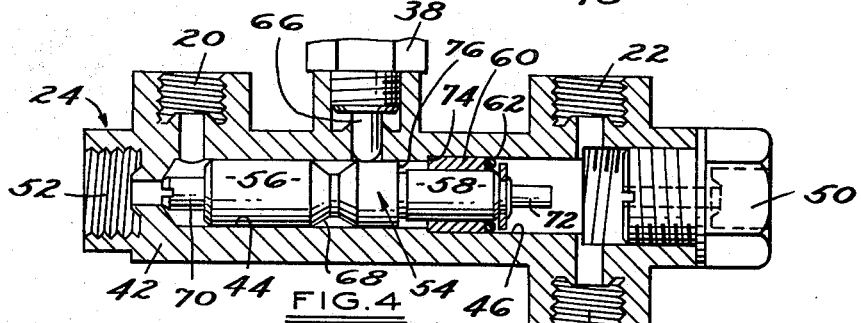
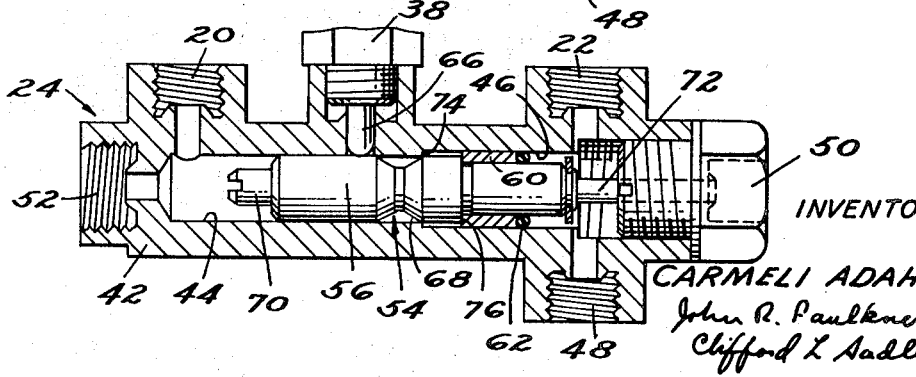
INVENTOR
CARMELI ADAHAN
John R. Faulkner
Clifford L. Sadler
ATTORNEYS

DIFFERENTIAL PRESSURE WARNING DEVICE FOR DUAL BRAKE SYSTEM

CROSS-REFERENCE TO RELATED APPLICATION

This application is a continuation of Ser. No. 785,218, filed Dec. 19, 1968, and now abandoned.

BACKGROUND OF THE INVENTION

In split brake systems, a dual master cylinder is provided having two mutually independent pressure chambers each of which feeds a separate half of the brake system. With this type of arrangement, the master cylinder has a first pressure chamber that directs pressure fluid to the rear brakes and a second pressure chamber that feeds hydraulic fluid to the front brakes. In the event of a hydraulic failure in either the front half or rear half of the split system, the other half remains intact and is still operative to arrest movement of the vehicle.

A dual or split system has many advantages, the obvious one being its ability to supply braking even though a leak has occurred in the system. The braking capability available, however, is adequate for emergency use only and the failure should be corrected as soon as possible. The usual dual master cylinder will provide a change in "pedal feel" upon failure of one-half of the system. While the driver should be able to detect this change in pedal characteristic, it is considered advantageous to provide a positive warning to indicate a failure in the system.

The prior art discloses devices that provide a signal when there is a pressure failure in a split brake system. With the prior art devices, however, it is necessary to at least partially disassemble the warning device in order to reset it to a neutral condition once the leak has been corrected.

Therefore, in view of the state of the art it is one of the principal objects of the invention to provide a differential pressure warning device for a split brake system that has a piston which moves in response to a pressure differential to actuate a warning device and which centers itself automatically when pressure is restored in both halves of the split system.

BRIEF SUMMARY OF THE DISCLOSURE

The present invention relates to a differential pressure warning device for a split brake system and, in its presently preferred embodiment, includes a housing having a bore that communicates with each half of the system. A shuttle piston is slidably disposed within the bore and the pressure fluid in the first and second halves of the system is in communication with the ends of the piston.

The bore has a large diameter portion and a small diameter portion. The shuttle piston has a large diameter portion in slidable engagement with the small diameter portion of the bore. The piston has a small diameter portion in general alignment with the large diameter portion of the bore. An annular piston is slidably disposed within the large bore portion and in slidable engagement with the small piston portion.

With this construction, the piston can shuttle to either the right or the left in the bore in response to a pressure differential caused by a failure somewhere in the system. Movement of the piston will actuate a switch in an electrical circuit containing a warning light or buzzer. The warning signal indicates to the vehicle driver that only a portion of the total brake system is operative. When the failure has been corrected and the pressures at the ends of the piston are equal, the piston will be automatically forced into a central position and thereby cause the contacts in the switch to open.

BRIEF DESCRIPTION OF THE DRAWINGS

The many objects and advantages of the present invention will become apparent upon consideration of the following detailed description and the accompanying drawings in which:

FIG. 1 is a schematic representation of a split brake system for a motor vehicle having a pressure differential warning device constructed in accordance with this invention;

FIG. 2 is a sectional view of the warning device of FIG. 1;

FIG. 3 is a sectional view corresponding to FIG. 2 disclosing the shuttle piston in a left-hand position resulting from a pressure failure in the left-hand portion of the hydraulic circuit; and FIG. 4 is a sectional view similar to FIG. 2 showing the piston in the right-hand position corresponding to a pressure failure in the other half of the hydraulic circuit.

DETAILED DESCRIPTION OF THE PREFERRED EMBODIMENT

Referring now to the drawings for a more complete understanding of this invention, FIG. 1 discloses a dual master cylinder 10 having separate pressure outlets 12 and 14. The dual master cylinder 10 may be of the type described in U.S. Pat. No. 3,376,704 issued Apr. 9, 1968 to J. J. Ihnacik and entitled Dual Master Cylinder for Brake System. The pressure outlets 12 and 14 are connected to mutually independent pressure chambers situated within the dual master cylinder 10.

Conduits 16 and 18 connect the outlets 12 and 14 of the master cylinder 10 with the inlets 20 and 22 of a differential pressure warning device 24. As will be described, the device 24 provides communication between the inlet 20 and brake line 26 which, in turn, is connected to left and right rear brake assemblies 28 and 30. The device 24 also provides communication between the inlet 22 and brake line 32 which is connected to left and right front brake assemblies 34 and 36.

The warning device 24 contains a switch 38 that is connected in electrical circuitry with a warning lamp 40. In accordance with the invention, means are provided in the device 24 for closing the switch 38 to light the warning lamp 40.

The warning device 24 includes a housing 42 having an internal bore with a small diameter bore portion 44 and a larger diameter bore portion 46. The inlet 22 communicates with the large diameter bore portion 46 and an outlet port 48. The brake line 32 is connected to the outlet port 48. A threaded plug 50 seals the end of the large bore 46.

The inlet port 20 communicates with the left end of the small diameter bore portion 44. Outlet port 52 is in axial alignment and communication with the small bore 44. Brake line 26 connects with the outlet port 52 and hence communicates with the inlet port 20.

A shuttle piston 54 has a large diameter portion 56 slidably disposed within the small bore 44. The piston 54 also has a small diameter portion 58 in general alignment with the large bore portion 46. An annular piston 60 is in slidable engagement with the small piston portion 58 and in slidable engagement with the large bore 46. An O-ring 62 is situated at the end of the annular piston 60 and in sealed engagement with both the bore 46 and piston portion 58. A snap ring 64 is fitted to the end of the small piston portion 58 and serves as a retainer to prevent the displacement of the O-ring 62 from the end of the piston portion 58.

Electrical switch 38 includes a plunger element 66 that is constructed to reciprocate along an axis perpendicular to the axis of the piston 54. The end of the plunger 66 is normally seated in a groove 68 formed in the large diameter portion 56 of the piston 54. The plunger 56 is constructed to move upwardly to close electrical contacts within the switch 38.

The shuttle piston 54 is constructed to move to either an extreme left or an extreme right-hand position in response to a pressure differential, as seen in FIGS. 3 and 4, respectively. A stop member 70 at the left-hand end of the small diameter piston portion 56 is designed to engage the housing 42 at the end of the bore 44 and to thereby limit the displacement of the shuttle piston 52. Similarly, a stop member 72 is formed on the right-hand end of the small diameter piston portion 38. Member 72 is constructed to engage the threaded plug 50 and to limit right-hand movement of the piston 54.

OPERATION

As noted previously, the inlet port 20 of the device 24 is in communication with the outlet port 52 by means of the end portion of the small bore 44. Therefore, fluid is free to flow from the master cylinder 10, through brake line 16 and device 24, and to the brake line 26. Similarly, inlet port 22 and outlet port 48 of the device 24 are in communication by means of the end portion of bore 46.

Fluid is, thus, free to flow from brake line 18 to brake line 32 by means of the device 24. As a consequence of this construction, the left-hand end of the large piston portion 56 is exposed to the pressure in the brake lines 16 and 26 and at the brakes 28 and 30. Similarly, the right-hand end of the small piston portion 58 and the right-hand end of the annular piston 60 is exposed to the hydraulic pressure in the lines 18 and 32 as well as the pressure at front brakes 34 and 36.

During normal operation the pressures at the ends of the piston 54 are approximately equal and the components maintain the orientation illustrated in FIG. 2. Under normal conditions the shoulder 74 between bore portions 44 and 46 is in alignment with shoulder 76 between the piston portions 56 and 58. In addition, the annular piston 60 is seated against both shoulders 74 and 76.

If a failure or leak should occur in the brake line 26 or some other portion of the rear half (left half as seen in FIG. 1) of the split brake system, then it would be impossible to develop pressure at the left end of the bore 44. Therefore, during a brake application hydraulic pressure would be present only at the right end of the bore 46 and this pressure would be imposed upon the right end of the small piston portion 58 and also upon the right end of the annular piston 60. Due to the leak, no offsetting or balancing pressure would be present against the left-hand end of the large piston portion 56 and, as a result, the shuttle piston 54 would move to the left as illustrated in FIG. 3. The annular piston 60 would be seated against the shoulder 74 formed at the juncture of the large and small bore portions 44 and 46. When the shuttle piston 54 moves to the left as seen in FIG. 3, the switch actuator 66 will be displaced upwardly closing the contacts within the switch 38 and causing the warning lamp 40 to be illuminated.

If after the hydraulic failure causing the piston 54 to move to the left (FIG. 3) has been sealed, it will then be possible to develop equal pressures at the left and right ends of the piston 54. With the annular piston seated against the shoulder 74, equal pressures at the ends of the piston 54 will cause it to move to the right until it is in its center position FIG. 2). With equal fluid pressures at the left of bore 44 and at the right of bore 46, a greater force will be developed on the piston 54 at its left end. The pressure acting upon the larger end area of the large piston portion 56 will produce a greater force than an equal pressure acting upon the end area of the small piston portion 58. The force differential will cause the piston to move to the right and return it to its FIG. 2 position.

The annular piston 60 will remain seated against the shoulder 74 and will not effect the return of the piston 54 to its center position. Once the piston 54 has been restored to its center position then the piston shoulder 76 will be seated against the annular piston 60. The piston 54 will not move to the right beyond the center point because of this engagement. The force created by the pressure in bore 44 acting across the end of large piston portion 56 will more than be offset by the larger force created by an equal pressure acting against the end area of the small piston portion 58 and against the end of the annular piston 60. Because of the bore shoulder 74, the pressure acting on the piston 60 will be unable to displace the shuttle piston 54 and, in fact, will maintain piston 54 in the central position of FIG. 2.

If a failure should occur in the line 32 so that it is impossible to develop pressure at the right-hand end of the large bore 46, then upon a brake application pressure will be developed only at the left end of small bore 44. Due to the presence of the pressure differential, the piston 54 will be displaced to the right until the stop member 72 is seated against the threaded plug 50. This will cause the plunger 66 to move upwardly and the circuit of switch 38 to be completed whereby lamp 40 will be illuminated. Right-hand displacement of the piston 54 will also cause right-hand displacement of the annular piston 60 due to its engagement with the shoulder 76.

When the hypothetical leak in line 32 is sealed, the next brake application will produce equal pressures in the left end of bore 44 and the right end of bore 46. Equal pressures at the ends of bore 44 and bore 46 will cause a greater effective force to be developed at the right hand of the piston 54. The force will be equal to the pressure acting against the end of the small piston 58 plus the pressure against the end of the annular piston 60. Because the accumulative area is greater than the end area of the large piston portion 56 alone, a brake application producing equal pressures in bores 44 and 46 will cause the piston 54 and annular piston 60 to move to the left until it is centered as in FIG. 2 and piston 60 is seated against shoulder 74. Once again the plunger 60 will be seated in the groove 68 and the lamp 40 will be extinguished. The annular piston 60 will abut the shoulder 74 and prevent further displacement of the shuttle piston 54 to the left.

CONCLUSION

It is thus seen that a warning device constructed in accordance with the present invention will activate a warning lamp when a pressure differential is present. The device has the further distinguishing characteristic that its shuttle piston will be automatically centered to its neutral position whenever equal or approximately equal pressures are present at its inlet ports. The centering of the shuttle piston 54 is automatically accomplished by its unique construction. It is to be noted that no spring devices are employed for positioning the piston 54.

The foregoing description presents the presently preferred embodiment of this invention. Alterations and modifications may occur to those skilled in the art that will come within the scope and spirit of the invention.

I claim:

1. A warning device for indicating a pressure differential between first and second hydraulic systems, said device including a housing having a central bore, said bore having a large diameter bore portion and a small diameter bore portion, said small diameter bore portion being in communication with said first hydraulic system and said large diameter bore portion being in communication with said second hydraulic system, a shuttle piston having a large diameter piston portion slidably engaging said small bore portion, said large diameter piston portion having an area exposed to the pressure of said first hydraulic system, said shuttle piston having a small diameter piston portion aligned with said large diameter bore portion, said small diameter piston portion having an area exposed to the pressure of said second hydraulic system, hydraulic pressure responsive means engaging said piston and constructed to urge said piston to a central position in response to equal hydraulic pressures in said first and second hydraulic systems, signal means constructed to sense axial displacement of said shuttle piston and to actuate a signal device in response to said axial displacement.

2. A warning device for indicating a pressure differential according to claim 1 and including:
first shoulder means formed at the juncture of said bore portions, second shoulder means formed on said piston at the juncture of said large diameter piston portion and said small diameter piston portion, said pressure responsive means normally engaging one of said shoulder means.

3. A warning device for indicating a pressure differential between first and second hydraulic systems, said device including a housing having a central bore, said bore having a large diameter bore portion and a small diameter bore portion, said small diameter bore portion being in communication with said first hydraulic system and said large diameter bore portion being in communication with said second hydraulic system, a shuttle piston having a large diameter piston portion slidably engaging said small bore portion, said large diameter piston portion having an area exposed to the pressure of said first hydraulic system, said shuttle piston having a small diameter piston portion, said small diameter piston portion having an area exposed to the pressure of said second hydraulic system, hydraulic pressure responsive means including annular piston means slidably engaging said large diameter bore portion and said small diameter piston portion, said hydraulic pressure responsive means being constructed to urge said shuttle piston to a central position in response to equal hydraulic pressures in said first and second hydraulic systems, signal means constructed to sense axial displacement of said shuttle piston and to actuate a signal device in response to said axial displacement.

4. A warning device for indicating a pressure differential between first and second hydraulic systems, said device including a housing having a central bore, said bore having a large diameter bore portion and a small diameter bore portion, shoulder means formed at the juncture of said bore portions, said small diameter bore portion being in communication with said first hydraulic system and said large diameter bore portion being in communication with said second hydraulic system, a shuttle piston having a large diameter piston portion slidably engaging said small bore portion, said large diameter piston portion having an area exposed to the pressure of said first hydraulic system, said shuttle piston having a small diameter piston portion, said small diameter piston portion having an area exposed to the pressure of said second hydraulic system, shoulder means formed on said shuttle piston at the juncture of said large diameter piston portion and said small diameter piston portion, annular piston means slidably engaging said large diameter bore portion and said small diameter piston portion, said annular piston means normally being seated with one of its ends in engagement with said first and second mentioned shoulder means, signal means constructed to sense axial displacement of said shuttle piston and to actuate a signal device in response to said axial displacement.

5. A warning device for indicating a pressure differential according to claim 4 and including:
said shuttle piston having an annular groove, said signal means including a switch having a plunger portion normally engaging said groove and constructed to be moved radially when said shuttle piston is displaced toward either end of said bore.

6. A warning device for indicating a pressure differential according to claim 4 and including:
said large bore portion having a greater diameter than said large piston portion, said small piston portion having a smaller diameter than said small bore portion.

7. A warning device for indicating a pressure differential according to claim 4 and including:
said shuttle piston having an annular groove, said signal means including a switch having a plunger portion normally engaging said groove and constructed to be moved radially when said shuttle piston is displaced toward either end of said bore, said large bore portion having a greater diameter than said large piston portion, said small piston portion having a smaller diameter than said small bore portion.

8. A warning device for indicating a pressure differential between first and second hydraulic systems, said device including a housing having a central bore, said bore having a large diameter bore portion and a small diameter bore portion, said small diameter bore portion being in communication with said first hydraulic system and said large diameter bore portion being in communication with said second hydraulic system, a shuttle piston having a large diameter piston portion slidably engaging said small bore portion, said large diameter piston portion having a lateral area exposed to the pressure of said first hydraulic system, said shuttle piston having a small diameter piston portion aligned with said large diameter bore portion, said small diameter piston portion having a lateral area exposed to the pressure of said second hydraulic system, sealing means interposed between said large diameter bore portion and said small diameter piston portion, hydraulic pressure responsive means engaging said shuttle piston and constructed to urge said shuttle piston to a central position in said bore in response to equal hydraulic pressures in said first and second hydraulic systems, signal means constructed to sense axial displacement of said shuttle piston from said central position and to actuate a signal device in response to said axial displacement.

9. A warning device for indicating a pressure differential between first and second hydraulic systems, said device including a housing having a central bore, said bore having a large diameter bore portion and a small diameter bore portion, said small diameter bore portion being in communication with said first hydraulic system and said large diameter bore portion being in communication with said second hydraulic system, a shuttle piston normally disposed in a central position in said bore, said shuttle piston having a large diameter piston portion slidably engaging said small bore portion, said large diameter piston portion having a lateral area exposed to the pressure of said first hydraulic system, said shuttle piston having a small diameter piston portion aligned with said large diameter bore portion, sealing means interposed between said large diameter bore portion and said small diameter piston portion, said small diameter piston portion having a lateral area exposed to the pressure of said second hydraulic system, said shuttle piston being axially displaceable from said central position to a first position near one end of said bore in response to a hydraulic pressure in said first hydraulic system that significantly exceeds the hydraulic pressure in said second hydraulic system, said shuttle piston being axially displaceable from said central position to a second position near the other end of said bore in response to a hydraulic pressure in said second hydraulic system that significantly exceeds the hydraulic pressure in said first hydraulic system, hydraulic pressure responsive means engaging said shuttle piston and constructed to restore said shuttle piston to said central position in response to equal hydraulic pressure in said first and second hydraulic systems after said shuttle piston has been displaced to either of said first or second positions, signal means constructed to sense axial displacement of said shuttle piston from said central position to one of said first or second positions and to actuate a signal device in response to said axial displacement.

10. A warning device for indicating a pressure differential between first and second hydraulic systems, said device including a housing having a central bore, said bore having a large diameter bore portion and a small diameter bore portion, first shoulder means formed at one end of said large bore portion, said small diameter bore portion being in communication with said first hydraulic system, said large diameter bore portion being in communication with said second hydraulic system, a shuttle piston having a large diameter piston portion slidably engaging said small bore portion, said large diameter piston portion having a lateral area exposed to the pressure of said first hydraulic system, said shuttle piston having a small diameter piston portion, said small diameter piston portion having a lateral area exposed to the pressure of said second hydraulic system, second shoulder means formed on said shuttle piston at one end of said small diameter piston portion, sealing means interposed between said large diameter bore portion and said small diameter piston portion, annular piston means slidably engaging said large diameter bore portion and said small diameter piston portion, said annular piston means normally being seated with one of its ends in engagement with said first and second shoulder means, signal means constructed to sense axial displacement of said shuttle piston and to actuate a signal device in response to said axial displacement.

11. A warning device for indicating a pressure differential between first and second hydraulic systems, said device including a housing having a central bore, said bore having a large diameter bore portion and a small diameter bore portion, first shoulder means formed at one end of said large bore portion, said small diameter bore portion being in communication with said first hydraulic system and said large diameter bore portion being in communication with said second hydraulic system, a shuttle piston normally disposed in a central position in said bore, said shuttle piston having a large diameter piston portion slidably engaging said small bore portion, said large diameter piston portion having a lateral area exposed to the pressure of said first hydraulic system, said shuttle piston having a small diameter piston portion, said small diameter piston portion having a lateral area exposed to the pressure of said second hydraulic system, second shoulder means formed on said shuttle piston at one end of said small diameter piston portion, sealing means interposed between said large diameter bore portion and said small diameter piston portion, hydraulic pressure responsive means including annular piston means slidably engaging said large diameter bore portion and said small diameter piston portion, said annular piston means normally being seated with one of its ends in engagement with said first and second shoulder means, said shuttle piston being displaceable from said central position to a first position near one end of said bore in response to a hydraulic pressure in said first hydraulic system that significantly exceeds the hydraulic pressure in said second hydraulic system, said shuttle piston being displaceable from said central position to a second position near the other end of said bore in response to a hydraulic pressure in said second hydraulic system that significantly exceeds the hydraulic pressure in said first hydraulic system, said hydraulic pressure responsive means being constructed to restore said shuttle piston to said central position in response to equal hydraulic pressures in said first and second hydraulic systems after said shuttle piston has been displaced to either of said first and second positions, signal means constructed to sense axial displacement of said shuttle piston from said central position to one of said first or second positions and to actuate a signal device in response to said axial displacement.

12. A motor vehicle brake system comprising a dual master cylinder, a pair of wheel brakes and mutually exclusive first and second hydraulic systems interconnecting said dual master cylinder and said brakes, a warning device for indicating a pressure differential between said first and second hydraulic systems, said device including a housing having a central bore, said bore having a large diameter bore portion and a small diameter bore portion, first shoulder means formed at one end of said large bore portion, said small diameter bore portion being in communication with said first hydraulic system and said large diameter bore portion being in communication with said second hydraulic system, a shuttle piston normally disposed in a central position in said bore, said shuttle piston having a large diameter piston portion slidably engaging said small bore portion, said large diameter piston portion having a lateral area exposed to the pressure of said first hydraulic system, said shuttle piston having a small diameter piston portion, said small diameter piston portion having a lateral area exposed to the pressure of said second hydraulic system, said large bore portion having a greater diameter than said large piston portion, said small piston portion having a smaller diameter than said small bore portion, second shoulder means formed on said shuttle piston at one end of said small diameter piston portion, sealing means interposed between said large diameter bore portion and said small diameter piston portion, hydraulic pressure responsive means including annular piston means slidably engaging said large diameter bore portion and said small diameter piston portion, said annular piston means normally being seated with one of its ends in engagement with said first and second shoulder means, said shuttle piston being displaceable from said central position to a first position near one end of said bore in response to a hydraulic pressure in said first hydraulic system that significantly exceeds the hydraulic pressure in said second hydraulic system, said shuttle piston being displaceable from said central position to a second position near the other end of said bore in response to a hydraulic pressure in said second hydraulic system that significantly exceeds the hydraulic pressure in said first hydraulic system, said hydraulic pressure responsive means being constructed to restore said shuttle piston to said central position in response to equal hydraulic pressures in said first and second hydraulic systems after said shuttle piston has been displaced to either of said first or second positions, said shuttle piston having an annular groove, signal means including means normally engaging said groove and constructed to be moved radially when said shuttle piston is displaced to either of said first or second positions, said signal means being constructed to actuate a signal device in response to said radial movement.

* * * * *